Sept. 29, 1959    H. G. ANDRÉ    2,906,802
ELECTRIC BATTERY
Filed May 5, 1955    2 Sheets-Sheet 1
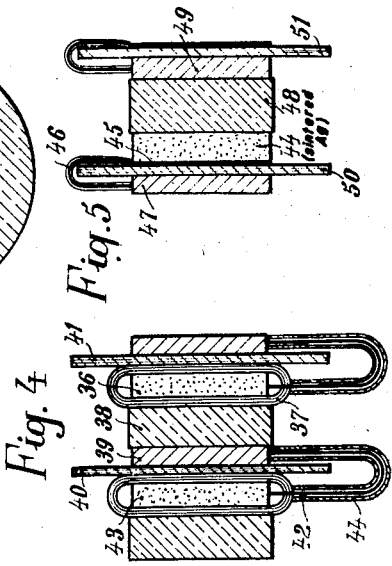
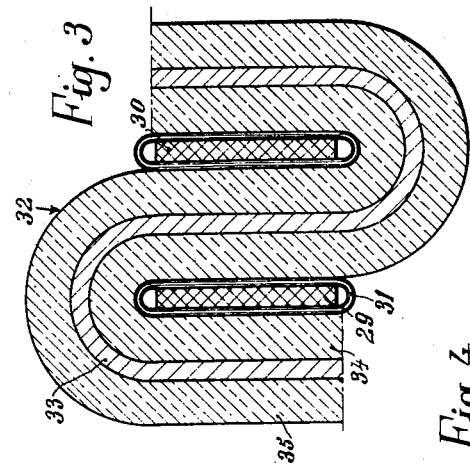
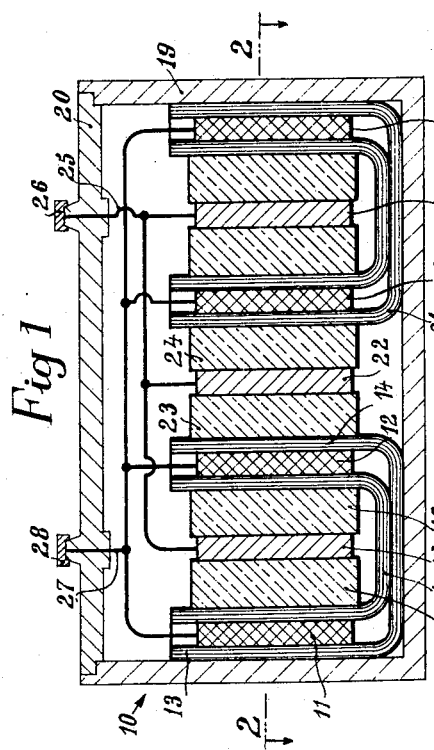
INVENTOR:
HENRI G. ANDRÉ
BY
Karl F. Ross
AGENT

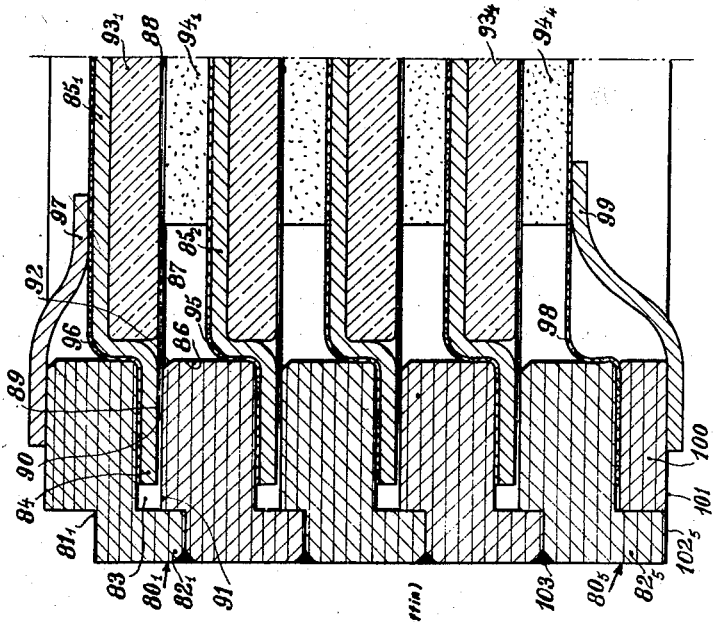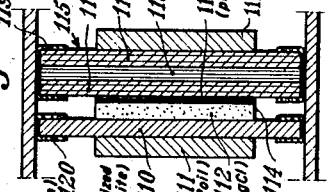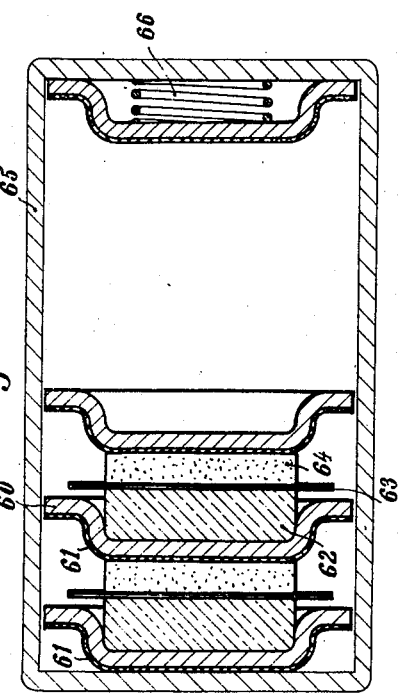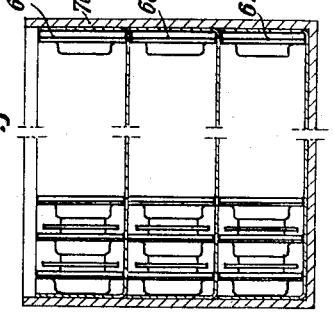

2,906,802
ELECTRIC BATTERY

Henri Georges André, Montmorency, France, assignor to Yardney International Corporation, New York, N.Y., a corporation of New York Application May 5, 1955, Serial No. 506,263

Claims priority, application France May 6, 1954

4 Claims. (Cl. 136—6)

This invention relates to an electrical battery or accumulator. The so-called silver-zinc primary or secondary batteries are coming into more and more widespread use owing to their light weight and to the high discharge rates at which they are adapted to be operated. Such accumulators comprise an alkaline electrolyte, generally an aqueous solution of potassium hydroxide, which may or may not contain potassium zincate according as the accumulator is operated by the so-called insoluble-negative-electrode process or the soluble-negative-electrode process; in the former case the electro-chemical reactions involve oxidation or hydrolization of the metals at the expense of the water in the electrolyte while in the latter case the zinc enters into solution in the electrolyte during the discharge stage and precipitates in the charge stage.

In such accumulators the electrolyte is used at sufficiently high concentrations to supply the necessary ions for the progress of the electro-chemical reactions, without however allowing the concentration to attain such high values as to lower the conductivity to an extent that according to general opinion would prevent the attainment of satisfactorily high rates of reaction. Actually the electrolyte concentration is always around 40° Bé., more or less, and rarely is higher than 44° Bé.

It has been suggested on the other hand to use a halide electrolyte, such as a chloride or a hydro-chlorate. Such electrolytes however are only used in primary batteries, because of the discharge of gas which would occur during the charge of an accumulator; such a discharge would not only be objectionable for obvious reasons, but would moreover modify the cell composition in an irreversible manner. Such primary batteries have been constructed using a silver chloride cathode and a zinc anode immersed in a solution of ammonium salts or zinc chloride.

One of the objects of this invention is to provide an electrical accumulator of the silver-zinc type which offers a number of advantages over known accumulators, whereby it is adapted for use in fields in which primary batteries have heretofore preeminently been used, and which fulfills certain conditions which were heretofore deemed impossible to satisfy by means of a rechargeable battery.

It is a further object of this invention to provide a preferably rechargeable electric battery which will not discharge any gas in operation. It is also an object to provide such a battery wherein the foregoing result is accomplished not only during normal operation of the battery, i.e. during charge and discharge thereof, but also under abnormal operating conditions, in particular in cases where the charge is continued over an excessive period of time.

It is consequently another object of the invention to provide an electric battery which can be contained in a perfectly gas-tight container or tank which can hence be positioned in any attitude without in any case incurring the risk of spilling electrolyte, so that it can be utilized under perfectly satisfactory conditions regardless of its orientation with respect to the vertical.

A further object is to provide a silver-zinc battery or accumulator wherein all danger of oxidizing the zinc and of carbonation is eliminated.

It is a further object to provide an accumulator wherein the charge will be automatically arrested, even if the accumulators should remain connected to a source of current, by the inherent operation of the accumulator itself and without the need for a load-cutoff switching device. A still further object of the invention is the provision of an accumulator wherein the equipment required for recharging is reduced to a minimum.

Yet a further object is to provide an accumulator which, while being adapted for a high number of charging operations, will weigh no more or less than a primary battery of similar capacity.

Still another object is the provision of a battery wherein the electro-chemical reaction both during charge and discharge comprises a single reaction, so that a highly constant output electromotive force is obtained throughout the entire discharge period, thereby making for optimum utilization of the stored energy.

Another object is to provide a battery or an accumulator wherein the danger of occurrence of local or secondary, parasitic reactions is practically eliminated, so that the battery will retain its charge indefinitely in open-circuit conditions and will be adapted to be charged with extremely low currents.

Also an object of the invention is the provision of a battery which can be constructed in miniature sizes while retaining its characteristics over very long periods and regardless of the frequency with which it is used.

A primary or a secondary battery according to my invention comprises a highly concentrated electrolyte, the concentration being substantially higher than what is used in known silver-zinc accumulators and even in accumulators of other types, and electro-chemically active substances in a state of such high division that, despite the comparatively low conductivity of the concentrated electrolyte, the accumulator or battery will deliver a discharge output current of useful magnitude.

Whereas it was the practice heretofore to start from an electrolyte having a concentration within a predetermined range which was accepted as normal in the art, and it was attempted for certain particular applications of the battery to obtain higher and higher rates of discharge, the invention on the other hand starts from the idea of tolerating substantially slower discharge and charge rates, so that by retaining the electro-chemically active substances in their comminuted form, as normally required for high discharge rates, there will still be obtained discharge and charge rates that are satisfactory for a wide range of technical purposes, even though the electrolyte concentration employed is so high as to be within a range hitherto believed inconsistent with the successful operation of an accumulator.

Whereas zinc chloride at concentrations above 50% has never been used hitherto as an electrolyte, the invention contemplates the use of such halide in concentrations essentially higher than 50%, and preferably higher than 52%. Good results have been obtained with an electrolyte comprising a zinc chloride solution in water in a density range of about from 55° to 75° Bé.

The invention provides an electric battery wherein the electrolyte comprises an aqueous solution of zinc chloride at a concentration such that a hygroscopic equilibrium is present between the electrolyte and the surrounding atmosphere under normal climatic conditions. Such a result is usually attained for concentrations of about 60° Bé.

Another important feature resides in the fact that in the battery according to the invention an electro-chemically active substance, such as zinc, is obtained by precipitation of the active substance from the electrolyte upon an appropriate support or carrier provided for the purpose. Such carrier may be made of zinc or of any other material adapted to polarize at the same potential as zinc, such as copper, brass, or an amalgamated metal. The resulting type of electro-chemically active substance, obtained by precipitation in situ, is comminuted to a sufficiently fine state of division to permit the delivery of a discharge current of useful magnitude in spite of the high concentration of the electrolyte.

The fact that the electrolyte constitutes the source from which the negative substance is derived, besides serving its conventional conductive function, contributes to the light weight of the resulting battery or accumulator.

In the case of a silver-zinc cell using zinc chloride as previously mentioned, the negative carrier used may be finely divided silver, compressed and if desired sintered. Such a carrier owing to the numerous pores contained in it yields a negative electrode possessing a large effective surface, thus promoting the progress of the electro-chemical reactions despite the high electrolyte concentration and comparatively high current density.

A further feature of a battery embodying this invention is that an electro-chemically active substance assumes an electrically insulating condition at the end of the charging period, thus automatically cutting off the charge current as the battery becomes fully charged. This feature combines in an exceptionally advantageous way with the concentrated character of the electrolyte in that the insulating character of the electrode is a result not only of the insulating nature of the active substance in the charged state, but also of the low conductivity of the electrolyte which impregnates the said substance. In fact the combination of both features just mentioned leads to a complete cut-off of the current flow under the normal conditions present on completion of a charge.

In case of the use of a highly concentrated zinc-chloride electrolyte, the silver chloride which forms during the charge period has a dense, finely divided structure which contributes to the insulating properties of the electrode when the battery or the accumulater is fully charged. As a result, the improved accumulator need not be provided with any type of ancillary cut-off device, thereby simplifying the equipment and, furthermore, eliminating the risk of defective operation of the cut-off device particularly in connection with accumulators contained in sealed casings.

A further advantageous feature of my improved battery or accumulator is that the electromotive force delivered by it, and consequently the voltage required for the charging operation, is lower than the dissociation voltage of water, so that in no event can there occur a gaseous discharge as a result of such dissociation. Consequently it is a specific advantage of the battery that the electrolyte therein is at a concentration so high that a normal charge current flowing through it will not cause electrolysis.

In a preferred form of an accumulator according to the present improvement, wherein the electrolyte consists of a concentrated aqueous solution of zinc chloride and wherein a silver anode is employed, the operation involves the following basic reaction:

$$2Ag + ZnCl_2 \rightleftharpoons 2AgCl + Zn$$

The above equation expresses the fact that during the charge the chlorine combines with the silver in two equivalents for one equivalent of zinc, and that the positive active substance (chlorine) and the negative substance (zinc) are both derived from the electrolyte.

Only the silver anodic carrier reacts with the electrolyte and should therefore be present in an equivalent weight, whereas the cathode carrier has the sole function of collecting the active zinc from the solution during the charge.

The output E.M.F. of such an accumulator is 0.9 volt. This E.M.F. results from the difference between the heat of formation of the zinc chloride and the heat absorbed by the reduction of $2AgCl$, i.e. approximately $$2.14 - 1.22 = 0.92 \text{ volt}$$

The absence of any secondary reactions between the cathode support and the electro-chemically active substance deposited thereon during the charge makes it possible for the battery to retain its charge, when in open-circuit condition, for practically indefinite periods of time. This is due inter alia to the strength of the chlorine-silver chemical bond, which cannot be broken by purely chemical means.

It is moreover contemplated, in order to prevent occurrence of local actions which might otherwise take place as a result of impurities in the zinc, to amalgamate the zinc, for example by adding traces of mercury di-chloride.

The battery operates in accordance with the above indicated equation practically throughout the entire charge period and the entire discharge period, thereby yielding a highly constant output voltage whereby such battery can be used as a standard-voltage generator especially if enclosed in a sealed container.

Another feature greatly contributing to the outstanding characteristics of the improved battery is the high stability of the zinc chloride in concentrated condition, whereby it is not liable to be carbonated nor to be oxidized even in the presence of zinc. This increased stability further makes it possible to construct small-size batteries retaining their desirable operating characteristics for very long periods, undesired crystallization and migration of salts being practically completely prevented.

At the end of the charge the anode becomes insulating owing to the formation of a continuous layer of silver chloride, thereby breaking the charge circuit without the use of an extraneous switch.

In the above mentioned batteries the comminuted silver may be in the form of sintered platelets or cakes so as to possess sufficient cohesion to retain its shape in spite of the great fineness of the constituent particles of the electrode.

In such batteries, however, the amount of silver of the electrode which actually participates in the electrochemical reaction is of the order of only 30% because of the fact that the silver chloride is electrically insulating, so that on formation of a sufficiently continuous and deep layer thereof the underlying silver is no longer able to react. On the other hand, it is not practicable to reduce the thickness of the electrodes made from silver because of the inherent character of the processes used in making them, which processes have to be of such nature as to confer upon the electrode, or to preserve therein, a porous structure which is essential for a successful progress of the electrochemical reactions. In accordance with another feature of this invention, therefore, there is provided a positive electrode for a battery of the type described which is exceedingly thin, specifically so thin that the silver chloride will not form an electrically insulating layer but will allow continued diffusion.

In accordance with this aspect of the invention, the silver is initially introduced into the battery in the form of silver chloride.

In one method of producing such an electrode, a suitable carrier, which desirably may be a sheet of paper, is coated with a layer of silver chloride and the resulting element constitutes the positive electrode of the battery. In this way a charged cell or battery is immediately obtained without it being necessary to resort to a stage of "formation."

The silver chloride can easily be produced in a suitable state of division and can easily be spread over a carrier in any desired depth, no matter how thin. The drying of the coating is so controlled that the finished coating will possess a hygroscopic degree corresponding to the desired mechanical cohesion for the electrode without being unduly fragile.

With such an electrode, initially consisting of silver chloride, all of the silver participates in the electro-chemical reactions. A lighter and cheaper battery or accumulator is thus produced, especially since silver is more economical in the form of silver chloride than in the form of metal. In fact the quantity of silver which has to be invested in a battery as silver chloride is four to five times less, all other things being equal, than the amount of silver which had to be used heretofore in metal form.

In the ensuing description, given for exemplary purposes only, reference will be had to the accompanying drawing wherein:

Fig. 1 is a diagrammatical sectional view of a battery according to the invention;

Fig. 2 is a section on line 2—2 of Fig. 1;

Fig. 3 is a section similar to Fig. 2, relating to a modification;

Fig. 4 is a sectional view of another modification;

Fig. 5 is a section relating to a further modification;

Fig. 6 is a sectional view of a battery according to another embodiment of the invention;

Fig. 7 is a diagrammatical view of a battery comprising a plurality of units according to Fig. 6;

Fig. 8 is a sectional view of part of a battery according to the invention, representing yet another embodiment; and Fig. 9 shows, in section, a portion of a battery comprising a silver chloride according to the invention.

Reference will first be made to Figs. 1 and 2. In the embodiment illustrated there, the battery 10 comprises a positive electrode including two plates or strips 11 and 12, initially consisting of sintered powdered silver, each inserted in a respective one of the branches 13 and 14 of a U-shaped casing, sheath or packing 15 made of regenerated cellulose sheeting such as cellophane. Disposed between and spaced from the branches or legs of the U is a cathodic support 16 consisting of a zinc plate, there being a sheet of inert absorbent material, such as blotting paper, extruded glass or the like, interposed between said support and the adjacent leg of the U, as shown at 17 and 18. In Fig. 1, there have been illustrated by way of example two positive U-shaped electrodes 11, 12 and 11', 12' juxtaposed within a casing 19 sealed by a cover 20, the inner legs 14 and 21 of the electrodes cooperating with the negative electrodes 16, 16' encompassed by the U's, and further cooperating with an intermediate negative electrode comprising a support consisting of a zinc strip or plate 22 lined on either side with layers of porous material 23 and 24. This assembly is impregnated with an electrolyte comprising an aqueous solution of zinc chloride, the concentration of the zinc chloride preferably being greater than about 52% by weight. The negative supports 16, 16', 22 are connected to a common conductor 25 leading to a negative terminal 26 and the silver strips or plates 11, 12, 11', 12' are also connected to a common conductor 27 leading to positive terminal 28.

In the embodiment shown in Fig. 3, the positive electrode is generally similar to the one used in the embodiment just described, in that it comprises a pair of strips 29 and 30 of compressed sintered silver powder encased in a U-shaped packing, sheath or envelope 31 of cellophane. The negative element 32 is pleated or accordion-shaped and comprises a zinc plate or support 33 lined on either side with a porous layer, 34 and 35 respectively, engaging the positive electrode. The pattern illustrated in Fig. 3 may be repeated any suitable number of times, with all the negative elements constituting a single accordion-pleated band, so that only a single conductor is required for connecting said elements to the correspoonding terminal of the battery.

Fig. 4 illustrates an embodiment comprising a stack of pairs or sets of electrodes, each set comprising a positive and a negative electrode. Each such pair or set consists of a sintered silver plate or strip 36, 43, encased in cellophane as shown at 37, the cellophane casing being in engagement with a layer of absorbent material 38 such as blotting paper impregnated with a concentrated zinc chloride solution, said layer being adjacent to a zinc strip 39 serving as a support. This pair is encased in two insulating sheets, 40 and 41, e.g. of mica, which serve to separate it from the adjacent, similarly constructed pairs. The respective pairs are connected in series by suitable conductors as indicated at 42, which connect each negative support 39 with the next following positive plate 43, and the conductor is surrounded with an insulating tube or sheath 44.

Referring next to Fig. 5, there is shown a plate 44 of sintered silver comprising within it a silver wire or grid 45 extended by a conductor, surrounded with an insulating tube 46', serving to connect it electrically with a negative support, in the form of a zinc strip or plate 47 forming part of an adjacent element. The silver plate 44 contacts one side of a porous layer 48 impregnated with electrolyte, the opposite side of which contacts the zinc plate 49. Insulator sheets, of mica, or the like, shown at 50 and 51, separate the element just described from the adjacent elements which are constructed similarly.

Reference will now be made to Fig. 6, which illustrates an embodiment wherein a negative support 60 consists of a cup-shaped zinc plate lined on one side with a silver sheet 61. This sheet is applied in a perfectly continuous manner over the zinc plate, so as to provide only for electric conduction without allowing any electro-chemical action to be set up between the sheet and the plate. Such lining or coating may be produced in any of the various ways well known in the art. According however to a preferred method of carrying out the invention, such silver-coated zinc plates may be produced by rolling a composite plate consisting of a lamination of a zinc plate with a silver plate, each rolling pass thus acting to increase the bond between the silver and zinc; the initial thicknesses of the silver and zinc strips are so selected as to produce a final lamination consisting of a zinc plate of suitable thickness for providing the negative element, with a silver lining of minimum depth sufficient to provide an unbroken surface coating. Forming part of each negative electrode, in addition to the support 60, is a pad 62 of absorbent material impregnated with a concentrated zinc chloride solution, the zinc being adapted to become deposited in the pores of said material during the charging operation. This electrode cooperates with a strip of sintered silver 64, from which it is separated by a cellophane sheet 63. This arrangement, while affording electric contact between the two elements 60, 64, through the silver layer 61, at the same time eliminates the necessity of using connecting wires as provided in both preceding embodiments, as well as the insulator sheets. An assembly of such elements is disposed in a trough-like casing 65. A resilient pressure device, such as a spring 66, may be provided for retaining the parts in assembly in a moderately compressed condition. The cup members 61 may have any suitable configuration when viewed in front elevation, such as rectangular, circular, and so forth.

A number of batteries similar to the one described may be stacked for series connection as shown at 67, 68 and 69, in a common container 70 (Fig. 7), the connections between the respective batteries being effected with the aid of conductors not shown.

Reference will now be had to Fig. 8 showing a further embodiment of the invention. Herein, the battery comprises a number of stacked frames $80_1$ through $80_5$, for example five as shown, made of suitable molded material such as polystyrene. The frames are formed with a peripheral outer recess $81_1$ etc. facing upwardly and adapted to cooperate with a peripheral flange or bead $82_1$ etc. of complementary shape (rectangular in the example shown) depending from the next higher frame of the stack. As shown, the vertical dimension of the flange is somewhat greater than that of the recess so as to provide a gap 83 adapted to receive in it the marginal portion 84 of a zinc plate 85 etc. The plate $85_1$ engages part of the vertical inner wall of the associated frame 80, so as to provide a gap 87 between the plate and a sheet of cellophane 88 engaging the under face 89 of the end part of the marginal portion 84. Desirably though not necessarily the cellophane sheet 88 projects as at 90 so that it will be retained between the under face 89 and the upper face 91 of successive frames $80_1$ etc.; face 91 may be suitably rabbeted as at 92. The interval between the sheet 88 and the rolled zinc plate $85_1$ etc. is filled in with absorbent material such as blotting paper $93_1$—$93_4$. The opposite side of the sheet 88 engages a sintered silver strip $94_1$—$94_4$. The entire assembly, and particularly blotter $93_1$ etc., is impregnated with a concentrated solution of zinc chloride in water. The connection between the various generator compartments, each of which comprises, as will be apparent from the foregoing, sintered silver and/or silver chloride on one side of the cellophane separator sheet and finely divided zinc and/or zinc chloride dispersed in the absorbent support on the other side of the separator sheet, is effected by means of a silver sheet 95 laminated to the zinc supporting plate $85_1$ etc. and contacting the sintered silver strip $94_1$ etc. of the adjacent compartment.

One end of the battery consists of a zinc supporting plate $85_1$, lined with a silver sheet 96 laminated thereto, cooperating with a conductive spring strip 97 connected with the negative terminal (not shown) and the opposite end consists of the sintered silver strip $94_4$ lined with a silver sheet 98 cooperating with conductive spring contact strip 99 connected with the positive terminal (also not shown). The sheet 98 is clamped between the under face of the frame $80_5$ and a base frame 100 the under face 101 of which is flush with the under face $102_5$ of the shoulder $82_5$. A suitable solvent is placed in grooves 103 formed at the joints between the frames in order to provide a self-supported sealed assembly.

Reference is now made to Fig. 9. Over an insert 110 made of plasticized graphite as disclosed in French patent application No. P.V. 667,836, filed October 14, 1954 by the assignee of the present application, there is applied a zinc foil element 111. On the other side of the graphite insert there is provided a positive electrode 114 according to the present invention, comprising an extra-thin layer 112 of silver chloride deposited on a thin paper sheet 113. The chloride layer may advantageously be of about the same order of magnitude as that of the supporting paper sheet, which in turn may be similar to a standard type of typewriting paper. During manufacture the insert sheet 110 and the positive electrode 114 may desirably be bonded together under slight pressure so as to provide a unitary element easy to handle and store, having substantial rigidity owing to the presence of the graphite sheet or strip; the production of slow-discharge silver-zinc batteries is thus made particularly quick and simple. The positive electrode 114 is separated from the associated negative electrode 111', which together with it constitutes an energy-generating unit, by a separator 115 comprising a semi-permeable material, e.g. a separator of the kind described in French patent application No. P.V. 672,846, filed July 13 1954 by the assignee of the present application, comprising two sheets 116 and 117 of paper, e.g. typing paper, surrounding one or more sheets 118 of regenerated cellulose or cellophane. The edge of the separator is coated with a film of paraffin as shown at 119. The edges of the insert 110 are also coated with paraffin as shown at 120. The inserts and separators are desirably formed with a larger area than the electrode. The paraffin coatings are thin enough to ensure that the adjacent electric elements are urged against one another in their central areas, which comprise the active substances, under pressure promoting the progress of the electro-chemical reactions.

What I claim is:

1. An uncharged electric battery comprising a casing, a plurality of laminated, bimetallic strips each having a zinc electro-negative side, and a plurality of stacked, series-connected cells in said casing; each of said cells comprising positive electrode means containing silver as an active material and including the side of one strip opposite said electronegative side thereof, the electro-negative side of an adjacent strip, spacing means maintaining said strips out of direct contact with each other, and a supply of electrolyte between said strips; non-conductive sealing means forming leakproof joints around said cells; and terminal connections extending from the outermost ones of said cells; said electrolyte being an aqueous solution of zinc chloride present in said solution in a concentration of substantially not less than 50% by weight.

2. A battery according to claim 1, wherein said spacing means includes semi-permeable separator means between said strips in each of said cells.

3. A battery according to claim 1, wherein said spacing means includes a bibulous layer saturated with said electrolyte.

4. A battery according to claim 1, wherein said positive electrode means of each cell further comprises a layer of silver chloride in contact with said opposite strip side.

References Cited in the file of this patent

UNITED STATES PATENTS

| 403,451 | Barrett | May 14, 1889 |
| 1,439,956 | Fuld | Dec. 26, 1922 |
| 1,662,866 | Salazar | Mar. 20, 1928 |
| 1,765,673 | Huntley | June 24, 1930 |
| 2,569,491 | Otto | Oct. 2, 1951 |
| 2,583,063 | Richardson | Jan. 22, 1952 |
| 2,594,710 | Andre III | Apr. 29, 1952 |
| 2,594,711 | Andre | Apr. 29, 1952 |
| 2,594,712 | Andre | Apr. 29, 1952 |
| 2,651,669 | Neumann | Sept. 8, 1953 |
| 2,666,801 | Victoreen | Jan. 19, 1954 |
| 2,762,858 | Wood | Sept. 11, 1956 |

FOREIGN PATENTS

| 3,717 | Great Britain | Apr. 26, 1890 |
| 577,165 | Great Britain | Apr. 16, 1946 |
| 712,561 | Great Britain | July 28, 1954 |